United States Patent [19]

Kusaka et al.

[11] Patent Number: 5,652,664
[45] Date of Patent: Jul. 29, 1997

[54] IMAGE SENSOR

[75] Inventors: Yosuke Kusaka, Yokohama; Akira Ogasawara, Kawasaki, both of Japan

[73] Assignee: Nikon Corporation, Tokyo, Japan

[21] Appl. No.: 453,488

[22] Filed: May 30, 1995

Related U.S. Application Data

[63] Continuation of Ser. No. 115,670, Sep. 2, 1993, abandoned, which is a continuation of Ser. No. 796,683, Nov. 25, 1991, abandoned.

[30] Foreign Application Priority Data

Nov. 29, 1990 [JP] Japan ..................... 2-332015

[51] Int. Cl.$^6$ ............... H04N 1/04; H01L 29/76
[52] U.S. Cl. ............... 358/483; 348/315; 348/323
[58] Field of Search ............... 358/482, 483, 358/209, 211, 213.11, 213.16, 213.17, 213.18, 213.19, 213.23, 213.26, 213.27, 213.29, 212, 221; 348/229, 230, 262, 315, 316, 323; 257/241

[56] References Cited

U.S. PATENT DOCUMENTS

| | | | |
|---|---|---|---|
| 4,471,227 | 9/1984 | D'Ascenzo | 358/212 |
| 4,635,126 | 1/1987 | Kinoshita | 358/213.19 |
| 4,646,155 | 2/1987 | Miyazawa | 358/213.29 |
| 4,754,153 | 6/1988 | Hicks | 348/323 |
| 5,303,053 | 4/1994 | Miyatake et al. | 257/241 |

FOREIGN PATENT DOCUMENTS

| | | | |
|---|---|---|---|
| 0112180 | 7/1982 | Japan | 358/483 |
| 360187054 | 9/1985 | Japan | 357/241 |
| 361292364 | 12/1986 | Japan | 257/241 |
| 401191469A | 8/1989 | Japan | 257/241 |
| 401248665A | 10/1989 | Japan | 257/241 |

OTHER PUBLICATIONS

Two Phase Charge Coupled Linen Imaging Device With Self-Aligned Duplicated Barriers; Choong Kim; Dec. 1974; pp. 55-58.

*Primary Examiner*—Jose L. Couso
*Assistant Examiner*—Jerome Grant, II
*Attorney, Agent, or Firm*—Shapiro and Shapiro

[57] ABSTRACT

An image sensor includes an element array consisting of a plurality of charge-coupled elements, a charge transfer unit for transferring a charge stored in the element array along a transfer path, a branch transfer unit, having a plurality of branch transfer paths, for selectively outputting on one branch transfer path at least part of the charge transferred through the transfer path of the charge transfer unit, and a plurality of amplifying units, arranged at output stages of the plurality of branch transfer paths of the branch transfer unit, for amplifying the transferred charge with different gains and outputting the amplified charges.

9 Claims, 10 Drawing Sheets

IMAGE SENSOR

This is a continuation application of Ser. No. 08/115,670 filed Sep. 2, 1993, which is a continuation of application Ser. No. 07/796,683 filed Nov. 25, 1991, both abandoned.

BACKGROUND OF THE INVENTION

1. Field of the Invention

The present invention relates to a focus detection apparatus and, more particularly, to a focus detection apparatus used in a single-lens reflex camera and capable of appropriately performing focus detection even if an object to be photographed has a low brightness level.

2. Related Background Art

As a conventional focus detection apparatus for a camera or the like, there is known an apparatus wherein an object image is photoelectrically converted using a photoelectric converting means such as a CCD element to obtain an object image signal, and focus detection is performed on the basis of the object image signal.

FIG. 19 shows a structure of part of a CCD element as a photoelectric converting means used in the above focus detection apparatus. The CCD element shown in FIG. 19 comprises a photodiode section PD for generating a charge upon photoelectric conversion, a barrier gate section BG, a storage section ST, a transfer gate section TG, a charge transfer register section CCD, a clear gate section CG, and an overflow drain section OFD. Of these sections, the photodiode section PD generates a charge corresponding to the amount of incident light upon photoelectric conversion. The barrier gate section BG receives a fixed voltage V1 to constitute a barrier between the photodiode section PD and the storage section ST. The charge generated by the photodiode section PD exceeds a potential of the fixed voltage V1 and flows in the storage section ST. The storage section ST receives a fixed voltage V2 and constitutes a potential well for storing the charge. The transfer gate TG is controlled in response to a transfer pulse $\phi T$ and transfers the charge stored in the storage section ST to the register section CCD. The clear gate section CG discharges an unnecessary charge of the storage section ST to the overflow drain section OFD in response to a clear pulse $\phi C$.

Referring to FIG. 19, the photodiode section PD, the barrier gate section BG, the storage section ST, the clear gate section CG, the overflow drain section OFD, and the transfer gate section TG are arranged in units of pixels. A plurality of pixels are linearly arranged along the register section CCD.

FIG. 20 shows potentials of the respective sections when a charge generated by the photodiode section PD is stored in the charge storage section ST. That is, in this case, the charge generated by the photodiode section PD constituting each pixel is transferred to the storage section ST through the barrier gate section BG. Since the potentials of the transfer gate section TG and the clear gate section CG are high, the charge is stored in the storage section ST.

FIG. 21 shows potentials of the respective sections when the charge stored in the storage section ST is transferred to the register section CCD. In this case, after the charge is stored in the storage section ST, the potential of the transfer gate section TG is decreased in response to the transfer pulse $\phi T$, and the charge stored in the storage section ST is transferred to the register section CCD.

The charge stored in the register section CCD is sequentially transferred in response to two phase clocks $\phi 1$ and $\phi 2$.

FIG. 22 shows potentials of the respective sections when the charge of the photodiode section PD is not stored. That is, in this case, the charge generated by the photodiode section PD is transferred to the storage section ST through the barrier gate section BG. On the other hand, since the potential of the clear gate section CG is set lower than that of the transfer gate section TG in response to the clear pulse $\phi C$, the charge input to the storage section ST is discharged to the overflow drain section OFD through the clear gate section CG.

In the photoelectric conversion element described above, the pixels are aligned along the register section CCD to constitute a line sensor, and a signal corresponding to a light amount distribution of the object is output to detect a focusing state.

In the photoelectric converting means described above, when the object brightness level is low, an output from the photoelectric conversion element is lowered, and at the same time, the signal-to-noise ratio is also lowered. As a result, it is difficult to perform focus detection.

In order to solve this problem, the area of the photodiode section PD of the photoelectric conversion element may be increased to increase a charge amount. Since the dimension of the photodiode section PD in the alignment direction is associated with the sample pitch of the object image and has an influence on the focus detection precision, the dimension of the photodiode section PD cannot be unlimitedly increased in this direction.

When the dimension of the photodiode section PD in a direction perpendicular to the alignment direction thereof is increased, a distance from the end of the photodiode section PD to the storage section ST is increased to undesirably prolong the charge transfer time. Charge storage control at a high brightness level becomes difficult, or charge transfer becomes imperfect to form an afterimage by a residual charge.

SUMMARY OF THE INVENTION

It is an object of the present invention to provide, in consideration of the drawbacks of the conventional apparatus described above, a focus detection apparatus capable of appropriately performing focus detection of an object having a low brightness level.

It is another object of the present invention to appropriately perform focus detection in a wide range from a low brightness level to a high brightness level without degrading response to the object.

A focus detection apparatus according to the present invention comprises a focus detection optical system for receiving part of light of an object to be photographed from a main optical system, photoelectric converting means for receiving an object image formed by the focus detection optical system, and focus detection calculating means for detecting a focus control state of the main optical system on the basis of an output signal from the photoelectric converting means, the photoelectric converting means including a plurality of element arrays arranged parallel to each other and having equal element pitches, a plurality of storage transfer means for respectively transferring storage charges of the plurality of element arrays, and charge synthesizing means for selectively synthesizing and outputting the charges transferred by the plurality of charge transfer means.

In the above arrangement, part of the light of the object from the main optical system is incident on the photoelectric converting means through the focus detection optical system. The photoelectric converting means generates an output signal corresponding to a light amount distribution of the object image, and the focus detection calculating means detects the focus control state of the main optical system on the basis of this output signal.

In this case, in the photoelectric converting means, instead of increasing the width of each element array, a plurality of element arrays are arranged parallel to each other, and the charges generated by the element arrays are independently transferred by different charge transfer means, and the storage charges of desired element arrays are synthesized and output by the charge synthesizing means. Since the storage charges of the plurality of element arrays can be synthesized and output for an object having a low brightness level, focus detection can be appropriately performed because the charge amount is increased. In addition, since the width of each element array of the photoelectric converting means need not be increased to a value larger than required, the charge can be transferred within a short of period of time. Difficulties in charge storage control at a high brightness level and a problem of an afterimage of the element array are not presented.

DESCRIPTION OF THE PREFERRED EMBODIMENTS

Preferred embodiments of the present invention will be described with reference to the accompanying drawings.

(1) General Description of Focus Detection Apparatus

Figure 1:
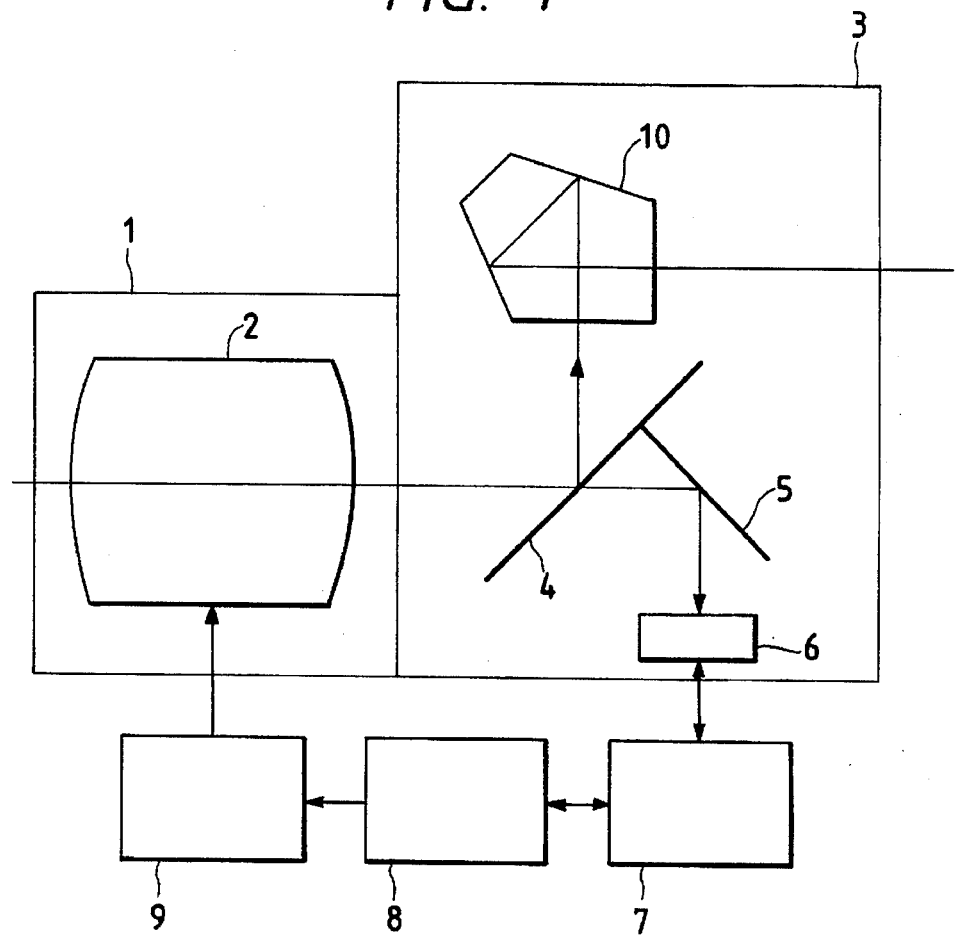
FIG. 1 is a block diagram showing a schematic arrangement of a single-lens reflex camera as an apparatus employing a focus detection apparatus according to the present invention.

FIG. 1 shows a schematic arrangement of a single-lens reflex camera to which a focus detection apparatus according to the present invention is applied. This apparatus includes a photographic optical system 2 mounted in a lens barrel 1, a camera body 3, a main mirror 4, a submirror 5, a focus detection module 6, an interface (IF) circuit 7, a focus detection calculation unit 8 comprising a microcomputer, a lens drive unit 9, and a pentagonal prism 10. The lens drive unit 9 includes a drive motor, a gear, and an encoder for detecting a drive amount.

In the arrangement of FIG. 1, most of the beams reflected by the object pass through the photographic optical system 2 and reflected by the main mirror 4. The reflected beams are directed toward a finder optical system including the pentagonal prism 10. Meanwhile, some beams having passed through the main mirror 4 are reflected by the submirror 5 and are incident on the focus detection module 6.

A plurality of object images are formed from the beams reaching the focus detection module 6 by a refocusing lens incorporated in the focus detection module 6. At the same time, the formed object images are photoelectrically converted to generate object image signals corresponding to the light amount distributions of the object images. Each object image signal is input to the microcomputer 8 through the IF circuit 7.

The microcomputer 8 calculates relative positional offset amounts of the plurality of object image signals corresponding to the plurality of object images. A defocus amount of the photographic optical system 2 is obtained on the basis of the offset amounts. A drive amount signal corresponding to a predetermined drive amount of the photographic optical system 2 to move the photographic optical system 2 to an in-focus position is calculated on the basis of the defocus amount. The lens drive unit 9 drives the photographic optical system 2 to set it in the in-focus state on the basis of the drive amount signal.

Figure 2:
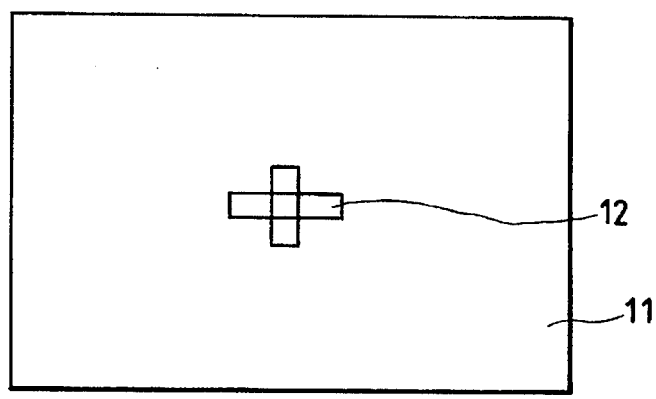
FIG. 2 is a view for explaining a focus detection area in the apparatus of FIG. 1.

FIG. 2 shows a cross-shaped focus detection area 12 located in the center of a photographic frame 11. Focus detection is performed on the basis of the light amount distribution of the object images in this focus detection area.

(2) Arrangement of Focus Detection Module

Figure 3:
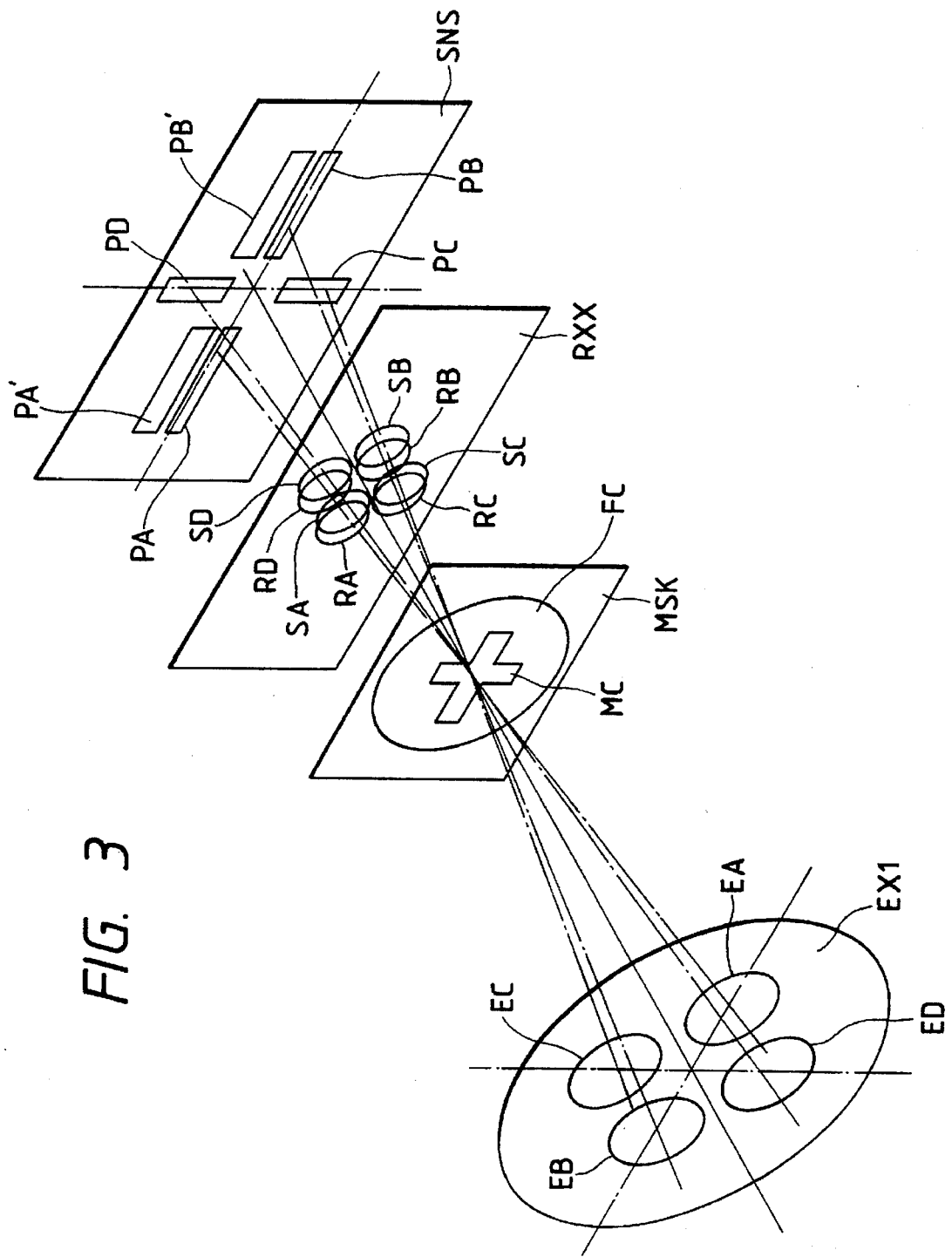
FIG. 3 is a view for explaining an arrangement of a focus detection optical system in the focus detection apparatus according to the present invention.

FIG. 3 shows a detailed arrangement of the focus detection module 6 shown in FIG. 1. This module includes a viewing mask MSK located near a prospective focus plane of the photographic optical system 2, a condenser lens FC, an aperture mask RXX, separator lenses, i.e., refocusing lenses SA, SB, SC, and SD, and a sensor SNS for performing photoelectric conversion.

The viewing mask MSK is located near the prospective focus plane of the photographic optical system 2 and has an opening MC corresponding to the position of the focus detection area 12 shown in FIG. 2. The aperture mask RXX has four aperture openings RA, RB, RC, and RD. Of these aperture openings, the openings RA and RB are horizontally arranged so as to interpose the optical axis therebetween. The openings RC and RD are vertically arranged so as to interpose the optical axis therebetween. The separator lenses SA, SB, SC, and SD are located behind the aperture openings RA, RB, RC, and RD of the aperture mask RXX. The separator lenses SA and SB are paired, and the separator lenses SC and SD are paired.

The sensor SNS has pixel arrays PA, PB, PA', PB', PC, and PD. The pixel arrays PA and PB, the pixel arrays PA' and PB', and the pixel arrays PC and PD are paired, respectively. The pixel arrays PA and PA' are arranged parallel to each other, and the pixel arrays PB and PB' are also arranged parallel to each other. Each pixel array consists of a plurality of pixels and constitutes a charge storage type one-dimensional pixel array. A line obtained by connecting the normally used pixel arrays PA and PB is located on the optical axis of the focus detection optical system, thereby improving optical characteristics free from optical aberrations.

In the focus detection module having the above arrangement, the aperture openings RC and RD of the aperture mask RXX are projected on pupil areas EC and ED of a preset pupil surface EXT by the condenser lens FC. The aperture openings RA and RB are projected on pupil areas EA and EB of the preset pupil surface EXT. The preset pupil surface EXT is set so that it is located at an average exit pupil position of a plurality of interchangeable lenses.

A primary image of the object formed near the prospective focus plane by the photographic optical system 2 through the pupil area EC passes through the opening MC of the viewing mask MSK and the opening RC of the aperture mask RXX and is refocused as a secondary image of the object on the pixel array PC of the sensor SNS by the separator lens SC.

A primary image of the object formed near the prospective focus plane by the photographic optical system 2 through the pupil area ED passes through the opening MC of the viewing mask MSK and the opening RD of the aperture mask RXX and is refocused as a secondary image of the object on the pixel array PD of the sensor SNS by the separator lens SD.

A primary image of the object formed near the prospective focus plane by the photographic optical system 2 through the pupil area EA passes through the opening MC of the viewing mask MSK and the opening RA of the aperture mask RXX and is refocused as a secondary image of the object on the pixel arrays PA and PA' of the sensor SNS by the separator lens SA.

Similarly, a primary image of the object formed near the prospective focus plane by the photographic optical system 2 by the pupil area EB passes through the opening MC of the viewing mask MSK and the opening RB of the aperture mask RXX and is refocused as a secondary image of the object on the pixel arrays PB and PB' of the sensor SNS by the separator lens SB.

The relative positional relationship of plural pairs of object images formed on the pixel arrays PA and PB, the pixel arrays PA' and PB', and the pixel arrays PC and PD with respect to the pixel alignment direction of the pixel arrays changes in accordance with a focusing state of the photographic optical system 2. Therefore, focus detection can be performed by detecting this relative positional relationship from the light amount distributions of the respective pairs of pixel arrays.

(3) Detailed Arrangement of Sensor SNS

Figure 4:
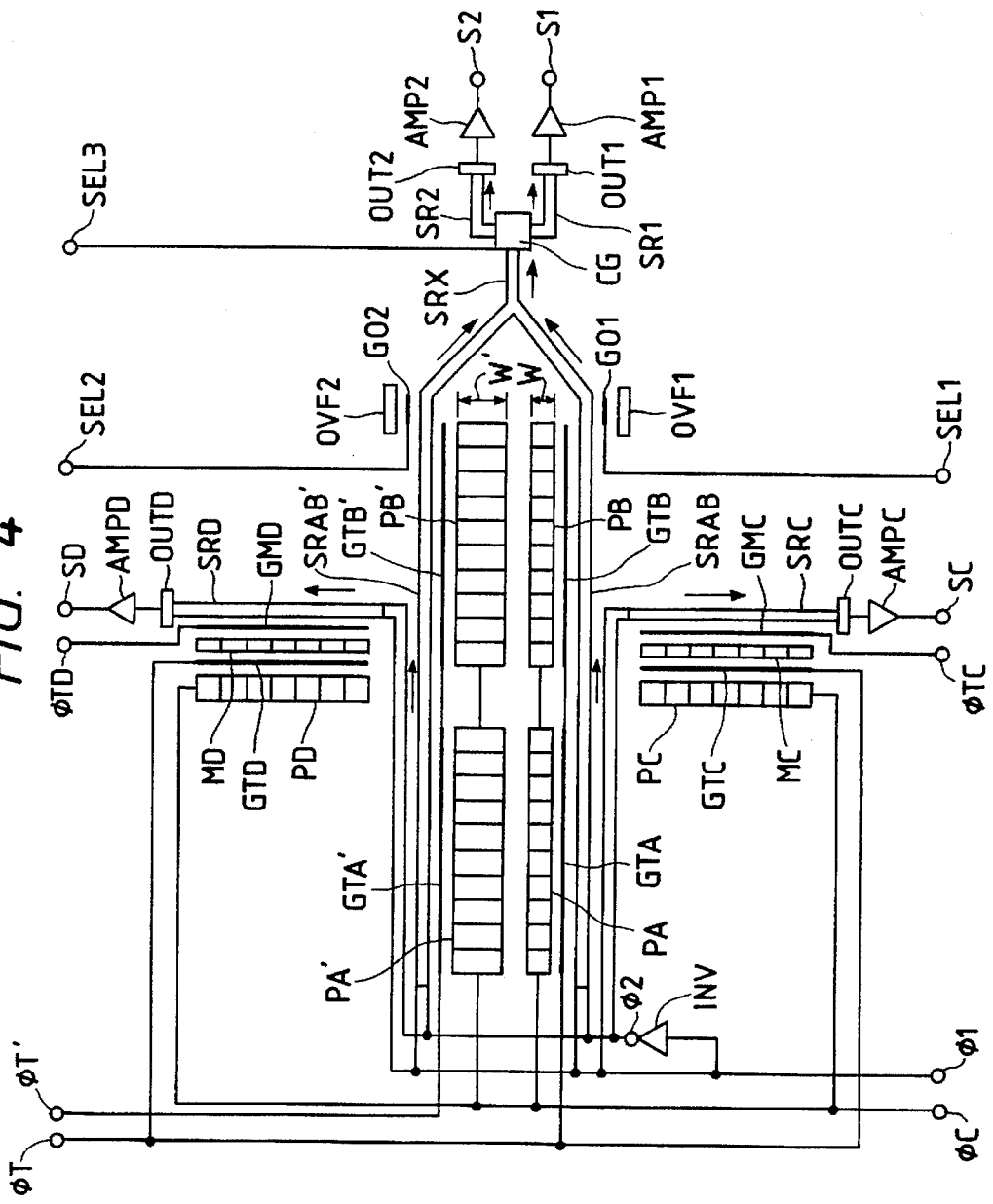
FIG. 4 is a view showing an arrangement of a photoelectric converting means in the focus detection apparatus according to the first embodiment of the present invention.

FIG. 4 shows a detailed arrangement of the sensor SNS shown in FIG. 3.

Pixel arrays PA, PB, PA', PB', PC and PD in FIG. 4 correspond to those in FIG. 3, respectively. Of these pixel arrays, each of the pixel arrays PA, PB, PA', and PB' consists of n pixels arranged at equal intervals. A pixel width W of the pixel arrays PA and PB is smaller than a pixel width W' of the pixel arrays PA' and PB'. Each of the pixel arrays PC and PD aligned in the vertical direction consists of m pixels.

Figure 19:
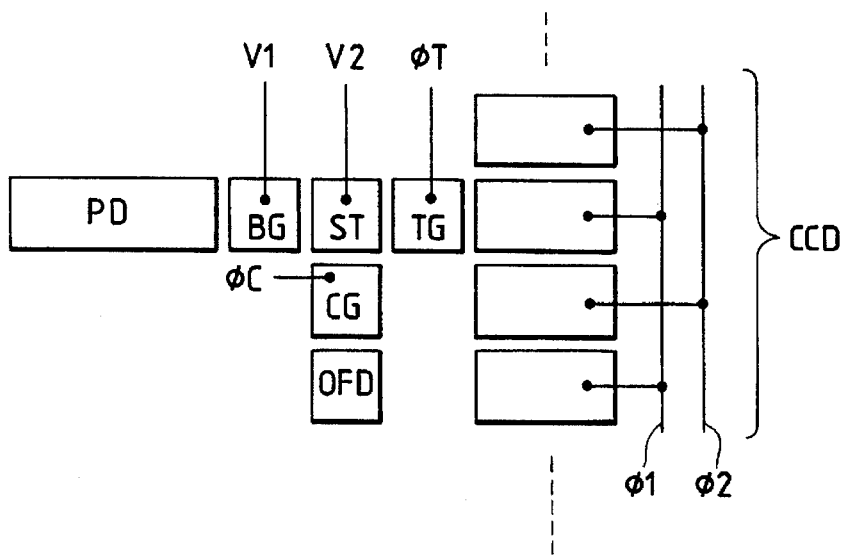
FIG. 19 is a view for explaining a structure of a conventional pixel in the photoelectric converting means.
Figure 20:
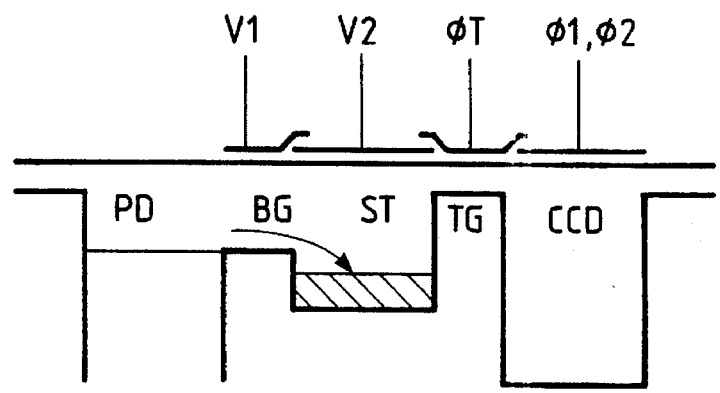
FIGS. 20, 21, and 22 are potential diagrams for explaining operations if the apparatus shown in FIG. 19.
Figure 21:
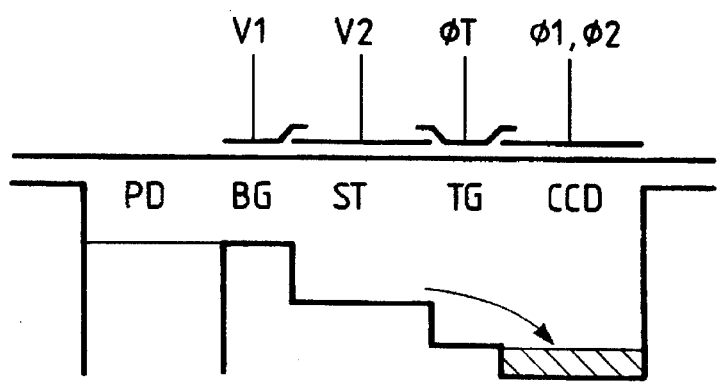
Figure 22:
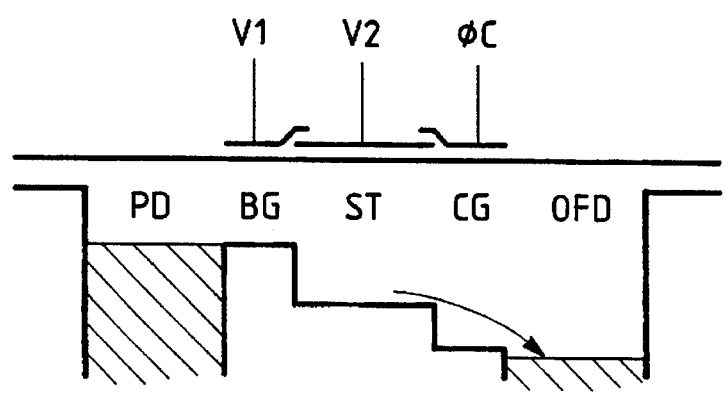

Each pixel constituting each pixel array comprises, e.g., the photodiode section PD, the barrier gate section BG, the storage section ST, the clear gate section CG, and the overflow drain section OFD, as shown in FIG. 19. Charges stored in the pixel arrays PA, PB, PC, and PD are controlled by a clear pulse $\phi C$ and a transfer pulse $\phi T$. Charges stored in the pixel arrays PA' and PB' are controlled by the clear pulse $\phi C$ and a transfer pulse $\phi T'$.

Note that when a pixel is projected on the prospective focus plane of the focus detection system shown in FIG. 3, the pixel width of each of the pixel arrays PA and PB used at a normal brightness level is set so that a pixel width of a projected image falls within the range of, e.g., about 0.1 to 1 mm. For example, when a reduction factor of the focus detection optical system is 0.25, the pixel width W is set to be 125 μm under the condition that the pixel width of the projected image is 0.5 mm.

To the contrary, the pixel width W' of each of the pixel arrays PA' and PB' used at a low brightness level is set within a range which does not pose any problem. More specifically, the pixel width W' falls within the range of about 200 to 400 μm. Since charges generated by the respective pixel arrays are synthesized by a common shift register (to be described later), a saturation charge amount of the common shift register must be designed in consideration of the synthesized charge amount. If a charge amount in the normal state is largely different from the synthesized charge amount, the S/N ratio in the normal state is decreased by noise generated by the shift register. For this reason, the ratio of the pixel width W to the pixel width W' of the corresponding pixel arrays is preferably set to satisfy the above conditions of the pixel widths. The ratio preferably falls within the range of about 1 to 5.

Figure 5:
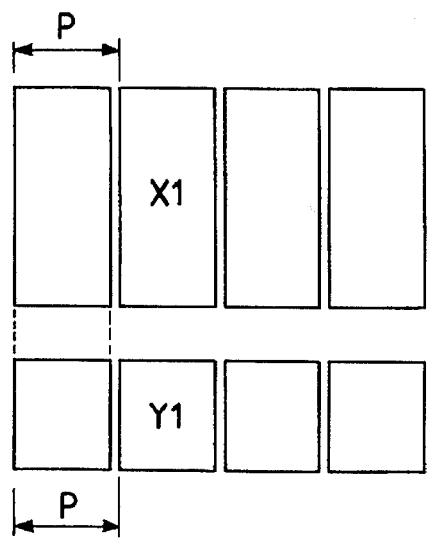
FIG. 5 is a view for explaining a shape or the like of a pixel array of the photoelectric converting means shown in FIG. 4.

The pixels of the pixel arrays PA and PB and the pixel arrays PA' and PB' have the same pitch P and the same phase, as shown in FIG. 5. That is, pixels X1 and Y1 serve as corresponding pixels in FIG. 5.

Figure 6:
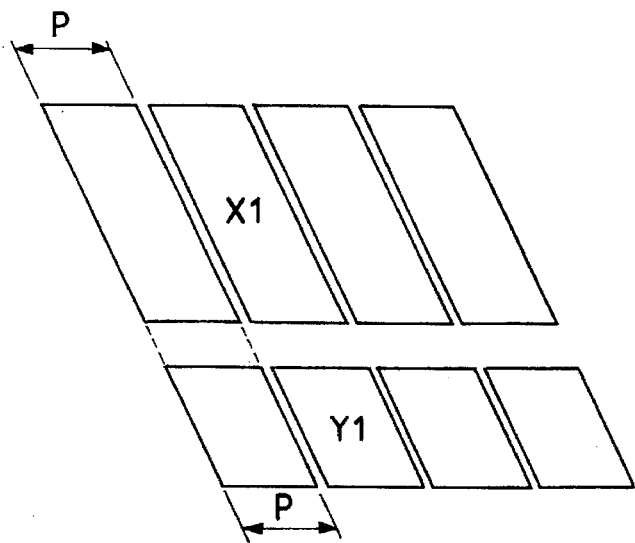
FIG. 6 is a view for explaining another shape or the like of the pixel array used in the photoelectric converging means shown in FIG. 4.

In order to improve focus detection precision for an image such as a vertical line chart, pixels of the pixel arrays PA and PB and the pixel arrays PA' and PB' are inclined at the same angle, as shown in FIG. 6.

Figure 7:
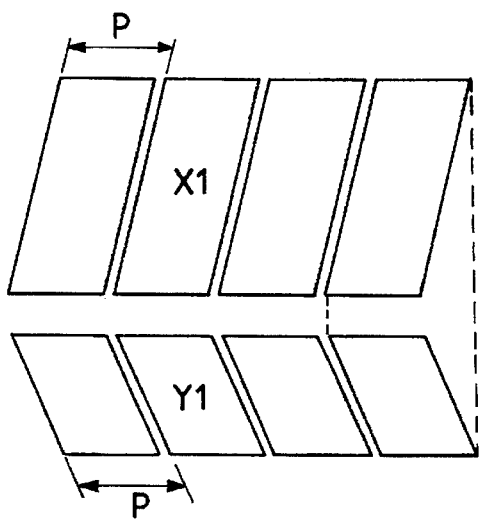
FIG. 7 is a view for explaining still another shape of the pixel array used in the photoelectric converting means shown in FIG. 4.

As shown in FIG. 7, the pixels of the opposite pixel arrays can be inclined in opposite directions to improve focus detection precision for oblique lines. According to an experiment, the inclination angle is preferably set so that a shift between the upper and lower portions of the pixels in the pixel alignment direction falls within the range of about 0.5 to 3 times the pixel pitch P.

Transfer gates GTA, GTB, GTA', GTB', GTC, and GTD are arranged for the pixel arrays PA, PB, PA', PB', PC, and PD, respectively. Of these transfer gates, the transfer gates GTA, GTB, GTC, and GTD receive the transfer pulse φT, and the remaining gates GTA' and GTB' receive the transfer pulse φT'.

Memory sections MC and MD are arranged near the transfer gates GTC and GTD, respectively. The memory sections MC and MD temporarily store the charges from the pixel arrays PC and PD, respectively. The memory section MC stores the charge from the end of storage of the pixel array PC to the end of charge transfer of the pixel arrays PA, PB, PA', and PB'. The memory section MD stores the charge from the end of storage of the pixel array PD to the end of charge transfer of the pixel arrays PA, PB, PA', PB', and PC.

Transfer gates GMC and GMD are arranged near the memory sections MC and MD, respectively. The transfer gate GMC receives the transfer pulse φTC, and the transfer gate GMD receives the transfer pulse φTD.

CCD shift registers SRAB, SRAB', SRC, and SRD transfer the charges stored in the pixels of the pixel arrays PA and PB, the pixel arrays PA' and PB', and the pixel arrays PC and PD of the sensor SNS. Each CCD shift register is a two-phase CCD register operated by two phase transfer clocks φ1 and φ2. The charges stored in the respective pixels of the pixel arrays PA and PB and the pixel arrays PA' and PB' are parallelly transferred to the shift registers SRAB and SRAB' in response to the transfer pulses φT and φT' and are serially transferred in a direction indicated by an arrow in FIG. 4 in response to the transfer clocks φ1 and φ2. Note that the transfer clock φ2 is obtained by inverting the transfer clock φ1 by an inverter INV.

Figure 8:
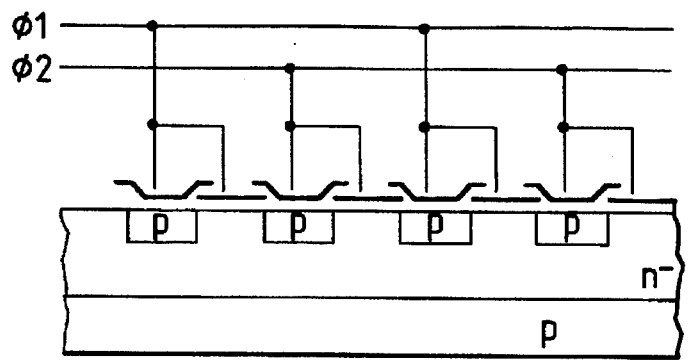
FIG. 8 is a sectional view fore explaining a structure of a CCD register used in the photoelectric converting means shown in FIG. 4.

Each two-phase CCD shift register has a structure shown in FIG. 8. That is, an n⁻-type semiconductor region is formed on a p-type semiconductor substrate, and a plurality of p-type regions are partially formed in the surface layer of the n⁻-type semiconductor region. A pair of transfer elements are formed by one p-type region and the adjacent n⁻-type region. Gate electrodes are respectively formed on the corresponding p- and n⁻-type regions of the paired elements. The transfer clocks φ1 and φ2 are alternately applied to the gate electrodes of each transfer element pair.

Figure 9:
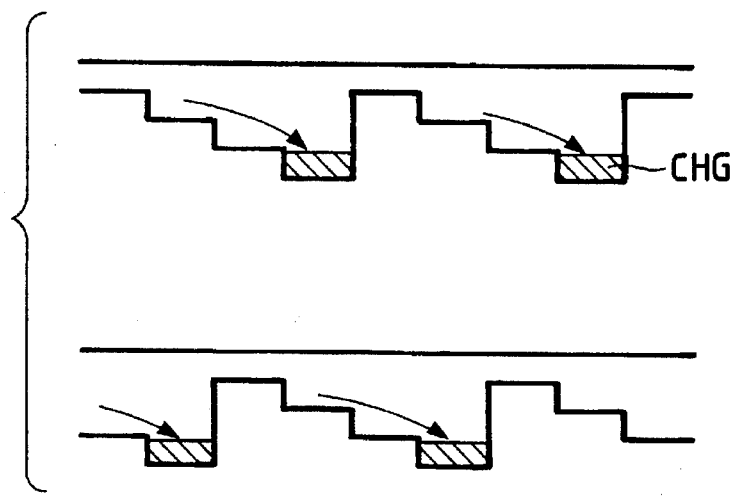
FIG. 9 is a potential diagram for explaining an operation of the apparatus shown in FIG. 8.

In this CCD shift register, when the transfer clocks φ1 and φ2 having a phase difference of 180° are alternately applied to each other transfer element pair, the potential well of the n⁻- and p-type regions is shifted in a predetermined direction, as shown in FIG. 9, thereby transferring a charge CHG. Each hatched portion in FIG. 9 illustratively represents the charge CHG.

Referring to FIG. 4, overflow drains OVF1 and OVF2 discharge unnecessary charges transferred by the shift registers SRAB and SRAB', respectively. The overflow drains OVF1 and OVF2 partially oppose the shift registers SRAB and SRAB' through clear gates GO1, GO2, respectively. The clear gates GO1 and GO2 control to determine whether the charges transferred by the shift registers SRAB and SRAB' are transferred to the subsequent elements or these charges are discharged to the overflow drains OVF1 and OVF2. When control signals SEL1 and SEL2 applied to the clear gates OVF1 and OVF2 are set at low level (L), the charges are discharged from the shift registers SRAB and SRAB'. However, when the control signals SEL1 and SEL2 are set at high level (H), the charges are transferred from the shift registers SRAB and SRAB' to the subsequent elements.

Figure 10:
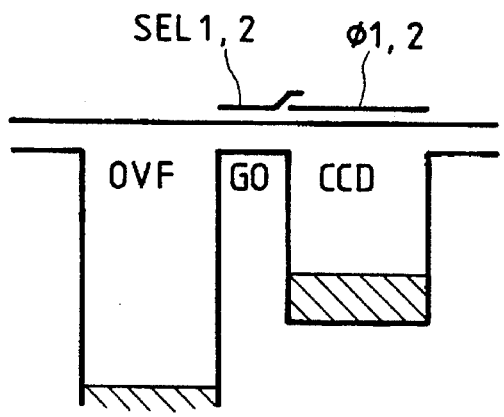
FIGS. 10 and 11 are potential diagrams for explaining an operation of a clear gate used in the photoelectric converting means shown in FIG. 4.

FIG. 10 shows potentials of the respective sections when the charges transferred by the shift registers SRAB and SRAB' are transferred to the next components. That is, since the control signals SEL1 and SEL2 are set at high level, the potentials of the clear gates GO (GO1 and GO2) are set high, and the charges of the CCD registers are not discharged to the overflow drains OVF (OVF1 and OVF2) but are transferred by the CCD shift registers in a direction perpendicular to the drawing surface.

Figure 11:
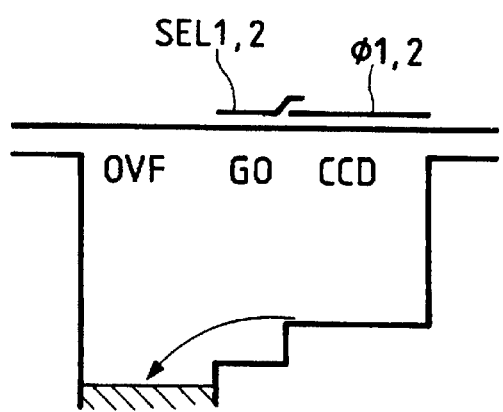

FIG. 11 shows potentials of the respective sections when the charges transferred by the CCD shift registers SRAB and SRAB' are discharged to the overflow drains OVF1 and OVF2. In this case, since the control signals SEL1 and SEL2 are set at low level, the potentials of the clear gates GO (GO1 and GO2) are set low, and the charges transferred by the CCD registers are discharged to the overflow drains OVF (OVF1 and OVF2).

Figure 12:
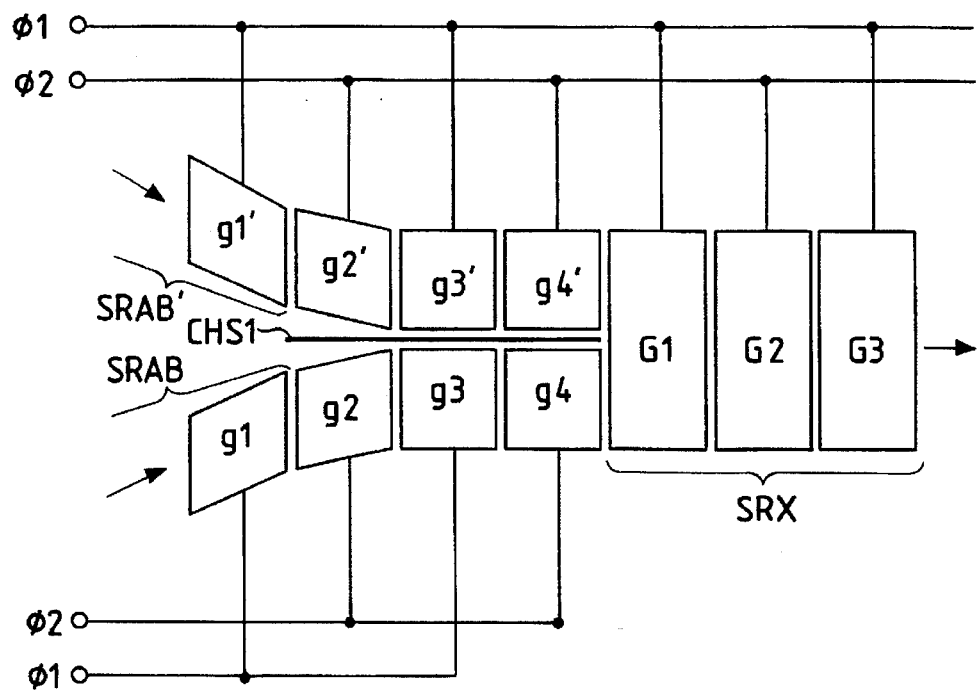
FIG. 12 is a view for explaining a structure of a shift register coupling section used in the photoelectric converting means shown in FIG. 4.

Referring back to FIG. 4, a shift register SRX commonly synthesizes the charges transferred by the shift registers SRAB and SRAB' and further transfers the synthesized charge. A structure for coupling the shift registers SRAB and SRAB' is shown in FIG. 12 in detail. Each of the shift registers SRAB and SRAB' and the shift register SRX has a structure in which transfer gates which receive the two phase transfer clocks φ1 and φ2 are alternately formed. In FIG. 12, the shift register SRAB is constituted by transfer gates g1, g2, g3, and g4, and the shift register SRAB' is constituted by transfer gates g1', g2', g3', and g4'. The shift register SRX includes a transfer gate G1 adjacent to the last transfer gates g4 and g4' of the shift registers SRAB and SRAB', and subsequent transfer gates G2, G3, . . . . The transfer clock φ1 is applied to the transfer gates g1, g3, g1', g3', G1, G3, . . . , and the transfer clock φ2 is applied to the transfer gates g2, g4, g2', g4', G2, . . . interposed between the above transfer gates. The shift registers SRAB and SRAB' have independent gate structures by a channel stopper CHS up to a portion in front of the coupling portion. However, from the coupling portion, i.e., at the first transfer gate G1 of the shift register SRX, the shift registers SRAB and SRAB' have a common gate structure.

The number of transfer gates of the shift register SRAB is set equal to that of the shift register SRAB'. When the common shift register SRX synthesizes the charges, the charges of the corresponding pixels of the pixel arrays PA and PB and the pixel arrays PA' and PB' are synthesized.

A transfer path switching section CG in FIG. 4 switches the transfer path of the charge transferred through the shift register SRX between shift registers SR1 and SR2 in response to a control signal SEL3. When the control signal SEL3 is set at high level (H), the charge transferred through the shift register SRX is transferred to the shift register SR1. However, when the control signal SEL is set at low level (L), the charge is transferred to the shift register SR2.

Figure 13:
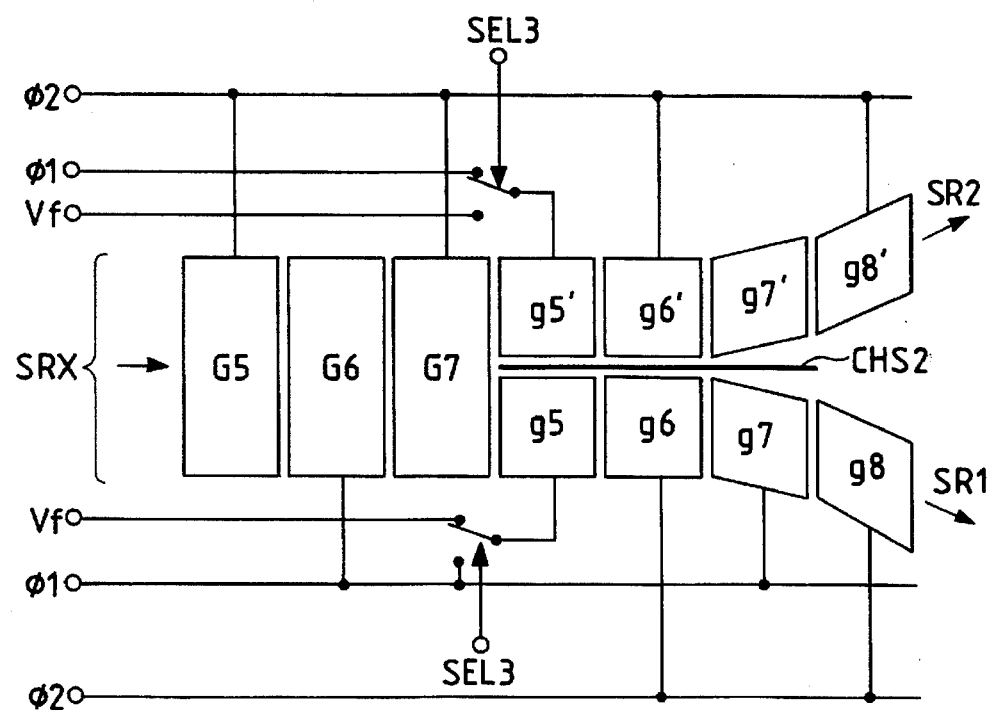
FIG. 13 is a view for explaining a structure of a path switching section used in the photoelectric converting means shown in FIG. 4.

FIG. 13 shows a detailed arrangement of the shift register transfer path switching section CG. The final stage of the shift register SRX has transfer gates G5, G6, and G7 arranged in the order named. First transfer gates g5 and g5' of the shift registers SR1 and SR2 are connected to the last transfer gate G7. The transfer gate g5 is followed by transfer gates g6, g7, g8, . . . , and the transfer gate g5' is followed by transfer gates g6', g7', gS', . . . . A channel stopper CHS2 is formed at the branch portion between the shift registers SR1 and SR2 to separate the shift registers from each other.

The transfer clocks φ1 and φ2 are alternately applied to the transfer gates of the shift register SRX. For example, the transfer clock φ1 is applied to the transfer gate G6, while the transfer clock φ2 is applied to the transfer gates G5 and G7. The transfer clock φ1 or a fixed voltage Vf switched by the control signal SEL3 is applied to the first transfer gates g5 and g5' of the shift registers SR1 and SR2 to which the transfer clock φ1 is supposed to be originally applied. The transfer clock φ2 is applied to the second and subsequent transfer gates g6, g8, g6', and g8', and the transfer clock φ1 is applied to the transfer gates g7 and g7'.

Of the shift registers SR1 and SR2, the charge transferred from the shift register SRX is transferred to the shift register, the first transfer gate of which receives the transfer clock φ1. The charge from the shift register SRX is not transferred to the shift register, the first transfer gate of which receives the fixed voltage Vf. The switch in FIG. 13 is set in a state wherein the control signal SEL3 is set at low level. In this case, the fixed voltage Vf is applied to the first transfer gate g5 of the shift register SR1, and the transfer clock φ1 is applied to the first transfer gate g5' of the shift register SR2. The charge transferred from the shift register SRX is transferred to the shift register SR2. However, when the control signal SEL3 is set at high level, the transfer clock φ1 is applied to the transfer gate g5, and the fixed voltage Vf is applied to the transfer clock g5'. In this case, the charge transferred from the shift register SRX is transferred to the shift register SR1.

The shift registers SR1 and SR2 and shift registers SRC and SRD have output sections OUT1, OUT2, OUTC, and OUTD. Output amplifiers AMP1, AMP2, AMPC, and AMPD are respectively connected to the output sections OUT1, OUT2, OUTC, and OUTD and generate output signals S1, S2, SC, and SD, respectively. Note that the gain of the output amplifier AMPC is equal to that of the amplifier AMPD, and that the gain of the output amplifier AMP2 is higher than that of the output amplifier AMP1 due to the following reason. When the charge amount is decreased at a low brightness level, the transfer path is switched to the shift register SR2 by the control signal SEL3, and the output signal S2 amplified with a higher gain is obtained.

Figure 14:
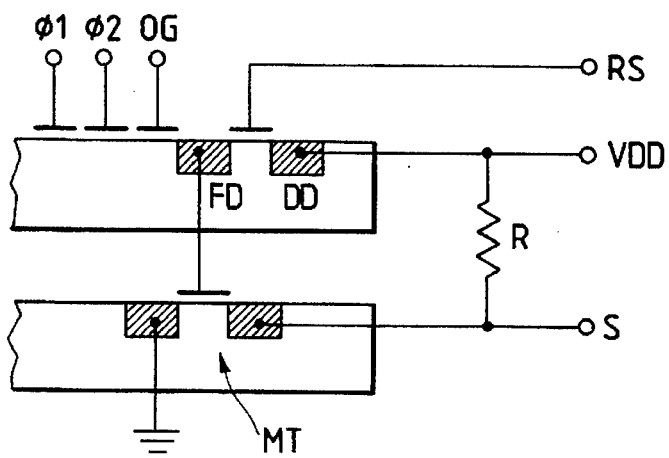
FIG. 14 is a view for explaining an output used in the photoelectric converting means shown in FIG. 4 and a structure of an amplifier section.

FIG. 14 shows a detailed structure of each output section and the corresponding output amplifier. Referring to FIG. 14, a floating diffusion section FD formed adjacent to the final CCD shift register, a drain DD, and a gate formed on a region between the floating diffusion section FD and the drain DD constitute the output section. A MOS transistor MT having a gate connected to the floating diffusion section FD, and a load resistor R constitute a MOS amplifier, i.e., the output amplifier.

With the above structure, the charge transferred from the output gate of the last CCD shift register is collected in the floating diffusion section FD and is applied to the gate of the output amplifier consisting of a power source $V_{DD}$, the resistor R, and the MOS transistor MT. The charge amount is converted into a voltage, thereby obtaining an output S. The charge of the floating diffusion section FD is discharged to the drain DD prior to transfer of the next charge in response to a reset signal RS, thereby resetting the floating diffusion section FD. In place of an arrangement wherein the transfer path of the shift register SRX is switched to connect the respective output sections to amplifiers having different gains, each output section may be selectively connected by a switch to a plurality of amplifiers having different gains. However, in this case, a stray capacitance between the output section and the gate of the MOS transistor MT is increased. It may then be difficult to realize an amplifier having a high gain. In the embodiment shown in FIG. 4, the charge transferred by the shift register SRX is switched and transferred to a different transfer path. The output amplifiers having different gains are respectively connected to the transfer output sections, thereby easily obtaining output amplifiers having high gains.

(4) Operation of Focus Detection Apparatus

An operation of the focus detection apparatus having the above arrangement will be described below. Signals applied to the respective sections in FIG. 4 are supplied through the interface circuit 7 on the basis of operation control of the microcomputer 8 (FIG. 1). In particular, the control signals SEL1, SEL2, and SEL3 are determined as follows by the microcomputer 8 prior to the start of the charge storage operation by the pixel arrays on the basis of the object images.

When the object brightness level exceeds a predetermined value L1, a sufficiently large charge amount can be obtained by only the pixel arrays PA and PB. In this case, only the pixel arrays PA and PB are used, and the gains of the output amplifiers are kept low to suppress noise.

Assume that the object brightness level falls within the range between the predetermined value L1 and a predetermined value L2. In this case, in order to increase the charge amount, charges from the pixel arrays PA and PB and the pixel arrays PA' and PB' are synthesized, and the gains of the output amplifiers are kept low to suppress noise.

In this case, only the pixel arrays PA' and PB' may be used, and the gains of the output amplifiers may be set low to suppress noise.

Assume that the object brightness level has a value smaller than the predetermined value L2. In this case, in order to increase the charge amount, the charges from the pixel arrays PA and PB and the pixel arrays PA' and PB' are synthesized, and the gains of the output amplifiers are kept high to compensate for a lack of a charge amount.

Operations at different object brightness levels will be described with reference to the timing charts.

Figure 15:
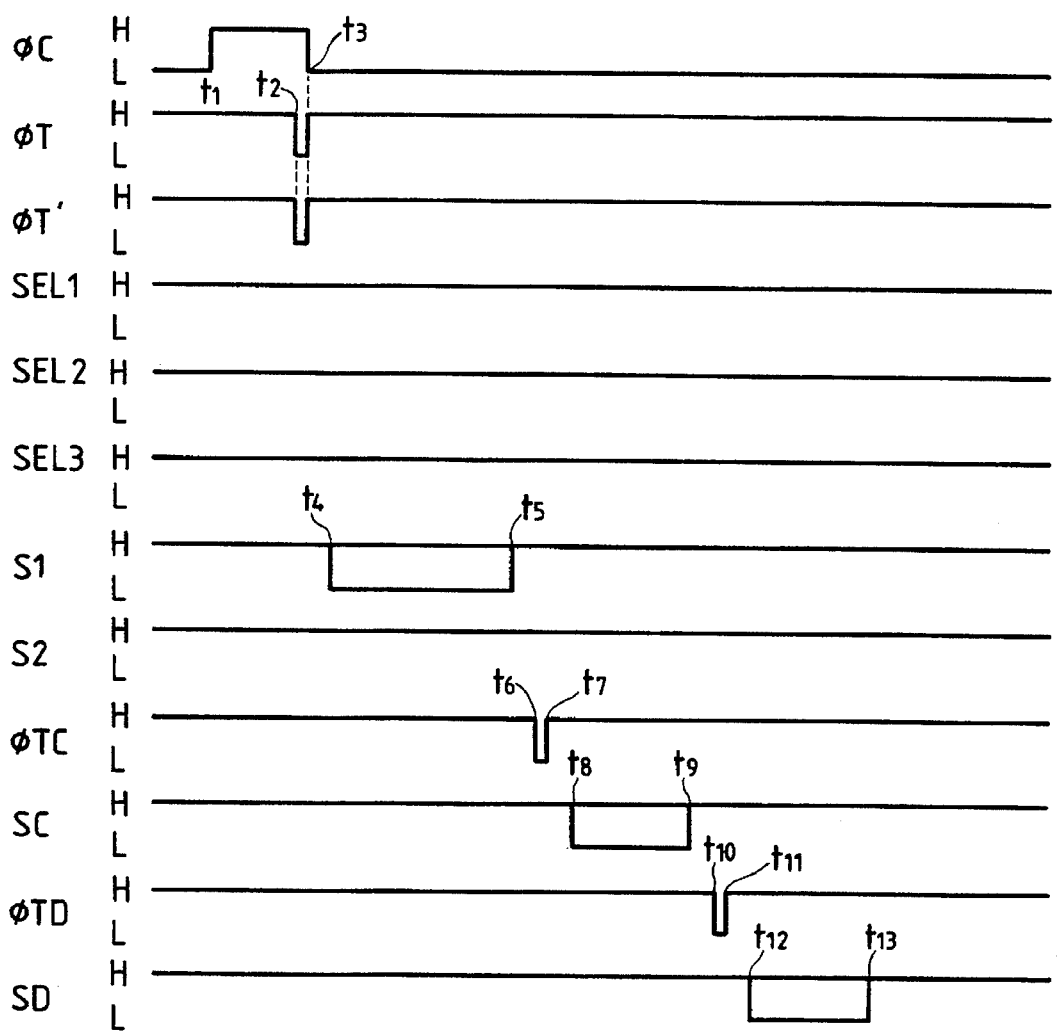
FIGS. 15 to 17 are timing charts for explaining operations of the focus detection apparatus according to the present invention.

FIG. 15 shows an operation performed when the object brightness value is the predetermined value L1 or less and the predetermined value L2 or more, i.e., a medium object brightness level. In this case, the control signals SEL1, SEL2, and SEL3 are set at high level (H), and an output is extracted from the amplifier AMP1 having a low gain.

The pixel arrays PA, PB, PA', PB', PC, and PD start charge storage from time t1 when the clear pulse φC is set at "H".

At time t2, the transfer pulses φT and φT' simultaneously go "L", and the stored charges are transferred from the pixel arrays PA, PB, PA', PB', PC, and PD to the shift registers SRAB and SRAB' and the memory sections MC and MD.

At time t3, the transfer pulses φT and φT' simultaneously go "H". The transfer of the stored charges to the shift registers SRAB and SRAB' and the memory sections MC and MD is completed. At the same time, the clear pulse φC goes "L", thereby completing charge storage of the respective pixel arrays.

The charges transferred to the shift registers SRAB and SRAB' are then transferred to the common shift register SRX in response to a transfer clock. Since both the control signals SEL1 and SEL2 are kept "H", the transferred charges are not discharged to the overflow drains OVF1 and OVF2 and are synthesized by the shift register SRX. In addition, since the control signal SEL3 is set "H", the charge synthesized by the shift register SRX is transferred to the shift register SR1. The output signal S1 amplified by the output amplifier AMP1 having a low gain is generated between time t4 and time t5.

At time t6, the transfer pulse φTC goes "L", and transfer of the charge temporarily stored in the memory section MC to the shift register SRC is started. At time t7, the transfer pulse φTC goes "H", and charge transfer to the shift register SRC is completed. The charges transferred to the shift register SRC are sequentially transferred in response to transfer clocks, so that an output signal SC appears between time t8 and time t9.

At time t10, the transfer pulse φTD goes "L", and transfer of the charge temporarily stored in the memory section MD to the shift register SRD is started. At time t11, the transfer pulse φTD goes "H", and transfer of the charge to the shift register SRD is completed. The charges transferred to the shift register SRD are sequentially transferred in response to transfer clocks, so that an output signal SD appears between time t12 and time t13.

Figure 16:
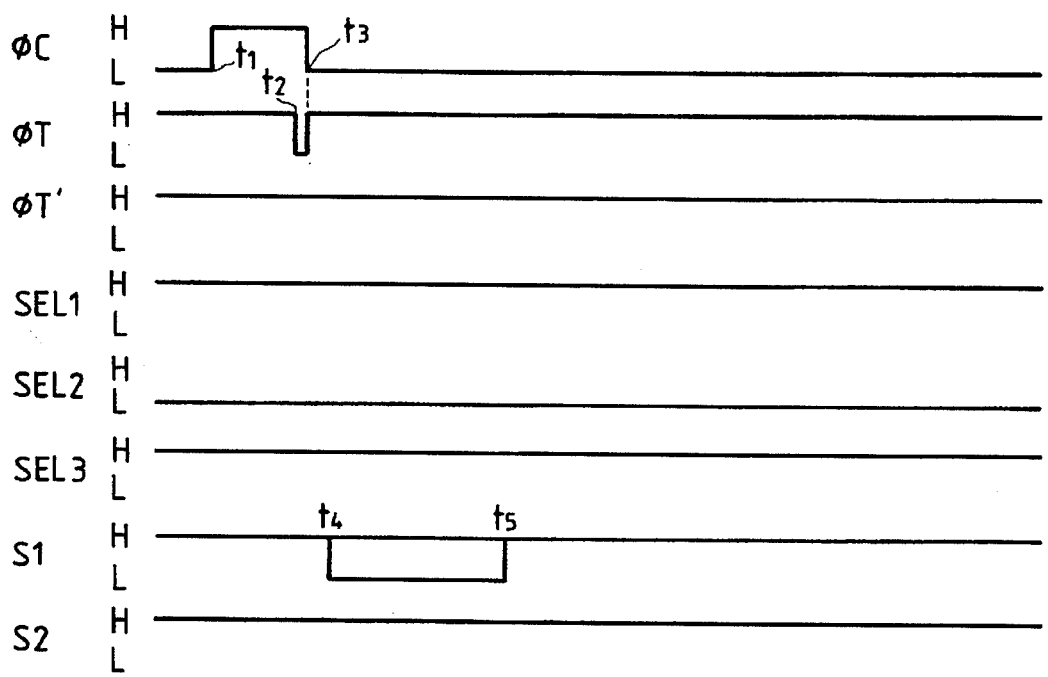

FIG. 16 shows an operation at a relatively high object brightness level. In this case, the charges from the pixel arrays PA and PB and the pixel arrays PA' and PB' are not synthesized. Only the charges stored in the pixel arrays PA and PB are used, and the gain of the output amplifier is set low. In this case, the control signal SEL1 is set "H", the control signal SEL2 is set "L", and the control signal SEL3 is set "H". Operations associated with the pixel arrays PC and PD are the same as those in FIG. 15, and a detailed description thereof will be omitted.

In this case, the pixel arrays PA, PB, PA', PB', PC, and PD start charge storage at time t1 when the clear pulse φC goes "H".

At time t2, only the transfer pulse φT goes "L", and the charges stored in the pixel arrays PA and PB are transferred to the shift register SRAB, and the charges stored in the pixel arrays PC and PD are transferred to the memory sections MC and MD. Since the transfer pulse φT' is kept at "H", charge transfer to the shift register SRAB' is not performed. In this case, the charges stored in the pixels of the pixel arrays PA' and PB' are discharged to the overflow drains OFD in the pixels.

At time t3, the transfer pulse φT goes "H", and the transfer of the charges stored in the respective pixel arrays to the shift register SRAB and the memory sections MC and MD is completed. At the same time, the clear pulse φC goes "L", thereby completing charge storage of each pixel array and discharging the unnecessary stored charges of the pixels to the overflow drains OFD.

The charge transferred to the shift register SRAB is transferred to the common shift register SRX in response to a transfer clock. At this time, since the control signal SEL1 is set at "H" and the control signal SEL2 is set at "L", noise charge generated and transferred by the shift register SRAB' is discharged to the overflow drain OVF2. The signal charge transferred by the shift register SRAB is not discharged to the overflow drain OVF1, but is transferred to the shift register SRX.

Since the control signal SEL3 is set at "H", the signal charge transferred to the shift register SRX is transferred to the shift register SR1. The output signal S1 amplified by the output amplifier AMP1 having a low gain appears between time t4 and time t5. The output signal S1 corresponds to the object image intensities of the pixel arrays PA and PB.

When the control signal SEL1 is set at "L" and the control signal SEL2 is set at "H", the object image signal can be obtained from only the pixel arrays PA' and PB'.

Figure 17:
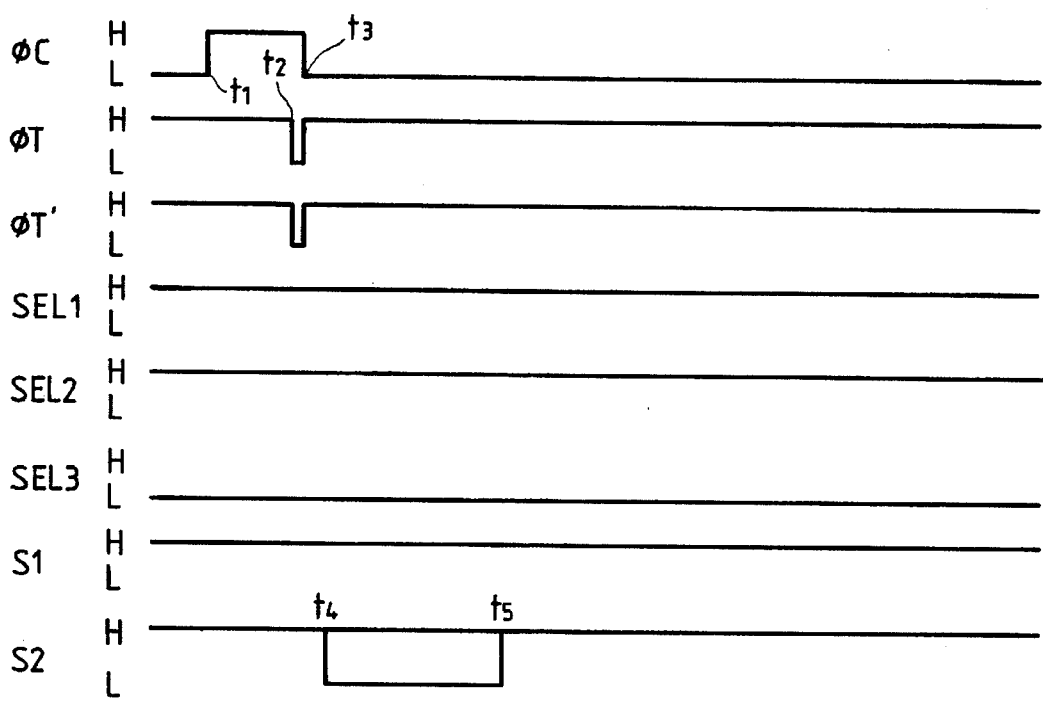

FIG. 17 shows an operation at a low brightness level. In this case, charges from the pixel arrays PA and PB and the pixel arrays PA' and PB' are synthesized, and the gain of the output amplifier is set high. The control signals SEL1 and SEL2 are set "H", and the control signal SEL3 is set "L". Operations associated with the pixel arrays PC and PD are the same as those in FIG. 15.

In this case, the pixel arrays PA, PB, PA', PB', PC, and PD start charge storage at time t1 when the clear pulse φC goes "H".

At time t2, the transfer pulses φT and φT' simultaneously go "L", and the charges stored in the respective pixel arrays are transferred to the shift registers SRAB and SRAB' and the memory sections MC and MD.

At time t3, the transfer pulses φT and φT' simultaneously go "H", and transfer of the charges from the respective pixel arrays to the shift registers SRAB and SRAB' and the memory sections MC and MD is completed. At the same time, the clear pulse φC goes "L", and the charge storage of the pixel arrays is completed.

The charges transferred to the shift registers SRAB and SRAB' are transferred to the common shift register SRX in response to a transfer clock. In this case, since both the control signals SEL1 and SEL2 are set "H", the transferred charges are not discharged to the overflow drains OVF1 and OVF2 but are synthesized by the shift register SRX. Since the control signal SEL3 is kept "L", the charge synthesized by the shift register SRX is transferred to the shift register SR2. The output signal S2 amplified by the output amplifier AMP2 having a high gain appears between time t4 and time t5.

The object image signals obtained from the outputs S1 or S2 and the outputs SC and SD are processed, e.g., A/D-converted by the microcomputer 8 (FIG. 1). A known focus detection operation is performed to obtain a defocus amount of the photographic optical system 2. The microcomputer 8 drives the photographic optical system 2 through the lens drive unit 9 on the basis of this defocus amount, thereby obtaining an in-focus state.

(5) Another Embodiment

When two parallel pixel arrays are arranged to improve low brightness characteristics as described above, the dimension of object images in a direction perpendicular to the pixel alignment direction of the arrays must be larger than that in the case of a single array. For this reason, the width of the opening MC of the viewing mask MSK in FIG. 3 must also be increased. In order to monitor the brightness of an object image incident on the pixel array in real time, a conventional arrangement is available wherein a monitor light-receiving element is arranged near the pixel array. If this arrangement is applied to the present invention, the width of the opening of the viewing mask must be further increased to guide the object image to the monitor light-receiving element. However, when the width of the opening MC of the viewing mask MSK is excessively increased, stray light may be formed in the focus detection optical system shown in FIG. 3.

Figure 18:
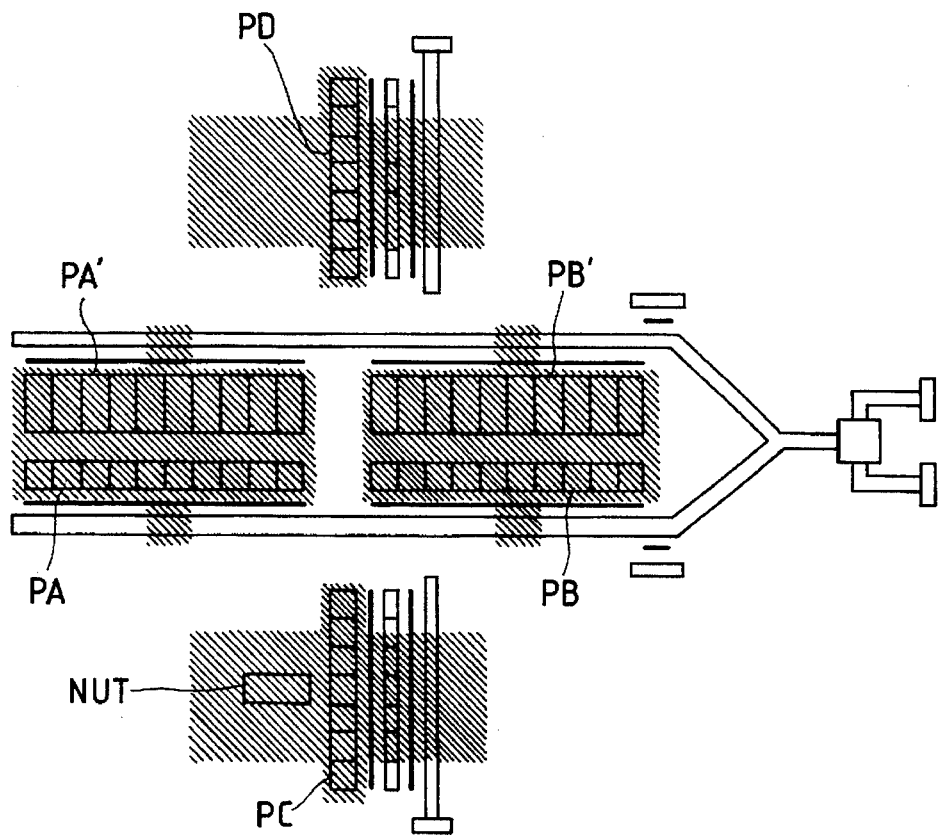
FIG. 18 is a view for explaining a structure near a photoelectric converting means in a focus detection apparatus according to another embodiment of the present invention.

FIG. 18 shows a layout of a monitor light-receiving element in a focus detection apparatus according to another embodiment of the present invention, from which the above drawback is eliminated. Referring to FIG. 18, hatched portions show object image formation portions limited by the opening MC of the viewing mask MSK. That is, four object images are formed on the sensor SNS by the four separator lenses SA, SB, SC, and SD shown in FIG. 3. The vertical dimension of the horizontally extending object image is slightly larger than that of the area including the pixel arrays PA and PA' or PB and PB'. The horizontal dimension of the object image in a direction perpendicular to the pixel alignment direction of the pixel arrays PC and PD is slightly larger than the dimension of each of the PA, PB, PA', and PB' in the pixel alignment direction. For this reason, the monitor light-receiving element MNT can be arranged in an object image which is projected on the pixel arrays PC and PD and which has a margin in a direction perpendicular to the pixel alignment direction of the pixel arrays PB and PC. Referring to FIG. 18, the monitor light-receiving element is formed in a margin portion of the object image formed on the pixel array PC. With this arrangement, the brightness of the object image can be appropriately detected without increasing the vertical dimension of the object image.

With the above arrangement, as a method of measuring an object brightness, there can be a method using an output from the monitor light-receiving element, a method using a separate brightness detecting element such as a photometric element of a camera, and a method of calculating the object brightness in accordance with an average output value of focus detection pixel arrays and a charge storage time required to obtain this average output value.

According to the present invention, as has been described above, in place of increasing the width of the pixel array, two parallel pixel arrays each having an appropriate width are arranged, and the charges generated by the respective pixel arrays are transferred by the separate transfer means. Difficulties in storage time control at a high brightness level and the problem of an afterimage of the pixel array can be eliminated. In addition, since the charges from the two arrays of transfer means are synthesized and a synthesized output is obtained, the charge amount is increased, and appropriate focus detection for an object having a low brightness level can be performed. Furthermore, since the charges are synthesized prior to formation of object image signals sent to the microcomputer, the microcomputer need not compare and process the object image signals when the microcomputer is to independently receive two object image signals and electrically synthesize them. At the same time, the transfer time can be shortened as compared with a case wherein two object image signals are separately sent, thereby achieving a high-speed response.

In the above embodiments, the number of pixel arrays is two. However, the number of pixel arrays may be three or more.

What is claimed is:

1. An image sensor comprising:

an element array including a plurality of charge-coupled elements;

a charge transfer device connected to said element array to transfer charges from said element array along a transfer path to an output portion;

a branch transfer CCD shift register having an input portion connected to said output portion of said charge transfer device and having an output portion with a plurality of branch transfer paths, said branch transfer CCD shift being constructed to output from a selected one of said branch transfer paths at least part of charges transferred along said transfer path of said charge transfer device; and a plurality of amplifiers connected to said plurality of branch transfer paths, respectively, to amplify charges output from said branch transfer paths with different gains, respectively, and to output the amplified charges.

2. An image sensor according to claim 1, wherein said charge transfer device and said branch transfer CCD shift register are driven in response to the same clock, and said output portion of said charge transfer device is connected to said input portion of said branch transfer CCD shift register through a plurality of gates that are operated to select one of said branch transfer paths.

3. An image sensor according to claim 1, further comprising:

a brightness detector which detects brightness of an object image formed on said image sensor; and a selector which selects one of the branch transfer paths in accordance with the detected brightness so that charges output from the selected branch transfer path are amplified with a high gain when the object image has a low brightness level.

4. An apparatus for forming focus control information of a photographic optical system based on light from a field of view, comprising:

a photoelectric converter which converts light from the field of view into an electrical signal; and a forming circuit which forms focus photographic information based on said electrical signal;

said photoelectric converter comprising:

an element array including a plurality of charge-coupled elements, a charge transfer device connected to said element array to transfer charges from said element array along a transfer path to an output portion, a branch transfer CCD shift register having an input portion connected to said output portion of said charge transfer device and having an output portion with a plurality of branch transfer paths, said branch transfer CCD shift register being constructed to output from a selected one of said branch transfer paths at least part of charges transferred along said transfer path of said charge transfer device, and a plurality of amplifiers connected to said plurality of branch transfer paths, respectively, to amplify charges output from said branch transfer paths with different gains, respectively, and to output the amplified charges.

5. An apparatus according to claim 4, wherein said charge transfer device and said branch transfer CCD shift register are driven in response to the same clock, and said output portion of said charge transfer device is connected to said input portion of said branch transfer CCD shift register through a plurality of gates that are operated to select one of said branch transfer paths.

6. An apparatus according to claim 4, further comprising:

a brightness detector which detects brightness of an object image formed on said photoelectric converter; and a selector which selects one of said branch transfer paths in accordance with the detected brightness so that charges output therefrom are amplified with a high gain when the object image has a low brightness level.

7. An image sensor comprising:

a plurality of element arrays each including a plurality of charge-coupled elements, said plurality of element arrays being arranged in parallel to each other along an array direction, a plurality of CCD charge transfer shift registers connected to said plurality of element arrays, respectively, to transfer charges from said plurality of element arrays along different transfer paths, respectively;

a charge synthesizer connected to said CCD charge transfer shift registers, to transfer charges from a selected one of said transfer paths or to synthesize charges from at least two of said transfer paths and to transfer the synthesized charges;

a brightness detector which detects brightness of an object image formed on said image sensor; and a controller which controls said charge synthesizer so as to synthesize charges from said different transfer paths when the detected brightness is a low brightness, but not when the detected brightness is a high brightness.

8. An image sensor comprising:

a plurality of element arrays each including a plurality of charge-coupled elements, said plurality of element arrays being arranged in parallel to each other along an array direction;

a plurality of CCD charge transfer shift registers connected to said plurality of element arrays, respectively, to transfer charges from said plurality of element arrays along different transfer paths, respectively;

a charge synthesizer connected to said CCD charge transfer shift registers, to transfer charges from a selected one of said transfer paths or to synthesize charges from at least two of said transfer paths and to transfer the synthesized charges;

a branch transfer CCD shift register connected to said charge synthesizer and having a plurality of branch transfer paths, said branch transfer CCD shift register being constructed to output on a selected one of said branch transfer paths at least part of charges transferred by said charge synthesizer; and a plurality of amplifiers connected to said plurality of branch transfer paths, respectively, to amplify charges output from said branch transfer paths with different gains, respectively, and to output the amplified charges.

9. An apparatus for forming focus control information of a photographic optical system based on light from a field of view, comprising:

a photoelectric converter which converts light from the field of view into an electrical signal; and a forming circuit connected to said photoelectric converter to form focus photographic information based on said electrical signal;

said photoelectric converter comprising:

a plurality of element arrays each including a plurality of charge-coupled elements, said plurality of element arrays being arranged in parallel to each other along an array direction, a plurality of CCD charge transfer shift registers connected to said plurality of element arrays, respectively, to transfer charges from said plurality of element arrays along different transfer paths, respectively, and a charge synthesizer connected to said CCD charge transfer shift registers, to transfer charges from a selected one of said transfer paths or to synthesize charges from at least two of said transfer paths and to transfer the synthesized charges;

said apparatus further comprising:

a brightness detector which detects brightness of an object image formed on said photoelectric converter; and a controller which controls said charge synthesizer to synthesize charges transferred from said plurality of CCD charge transfer shift registers when the detected brightness is a low brightness, but not when the detected brightness is a high brightness.

* * * * *